United States Patent [19]

Whitehead

[11] Patent Number: 4,502,452
[45] Date of Patent: Mar. 5, 1985

[54] VALVE

[75] Inventor: David A. Whitehead, Stamford, England

[73] Assignee: Massey-Ferguson-Perkins Limited, London, England

[21] Appl. No.: 548,890

[22] PCT Filed: Feb. 1, 1983

[86] PCT No.: PCT/GB83/00023

§ 371 Date: Sep. 26, 1983

§ 102(e) Date: Sep. 26, 1983

[87] PCT Pub. No.: WO83/02987

PCT Pub. Date: Sep. 1, 1983

[30] Foreign Application Priority Data

Feb. 17, 1982 [GB] United Kingdom ............... 8204682

[51] Int. Cl.$^3$ ........................................... F02M 27/00
[52] U.S. Cl. ................................. 123/574; 123/572
[58] Field of Search ................. 123/572, 573, 574; 251/DIG. 2; 137/494

[56] References Cited

U.S. PATENT DOCUMENTS

| 3,144,011 | 8/1964 | Anthes ............................... 123/574 |
| 3,620,197 | 11/1971 | Albright ............................. 123/574 |
| 3,662,724 | 5/1972 | Ohar . | |
| 3,678,910 | 7/1972 | Marlett ............................... 123/574 |
| 3,766,933 | 10/1973 | Nicholson . | |
| 4,125,127 | 11/1978 | Harter . | |
| 4,217,870 | 8/1980 | Schleiermacher ................ 123/572 |
| 4,373,499 | 2/1983 | Bendig ............................... 123/574 |
| 4,390,036 | 6/1983 | Atnanassiu ................. 251/DIG. 2 |

FOREIGN PATENT DOCUMENTS 2308850 11/1976 France .
1449258 9/1976 United Kingdom .

Primary Examiner—Ronald H. Lazarus
Attorney, Agent, or Firm—Robert L. Farris

[57] ABSTRACT

A valve comprises rolling diaphragm (7) supported at its outer periphery by an annular support member (8) within which the diaphragm rolls in response to inlet pressure so as to uncover an outlet opening (20) in the support member, thereby to allow the escape of said pressure. Preferably, the diaphragm (7) is annular and is supported at its inner periphery by a guide member (9) that engages on abutment (19) when the outlet opening (20) is closed by the diaphragm, and that guides the diaphragm as it rolls back and opens the outlet opening (20). Preferably, the outlet opening (20) is of reduced width towards that part which is first uncovered by the diaphragm in operation. The valve may include a two part housing (1, 4) with the support member (8) located between the two parts and with the outer periphery of the diaphragm (7) gripped between one part of the housing (4) and the support member (8).

7 Claims, 8 Drawing Figures

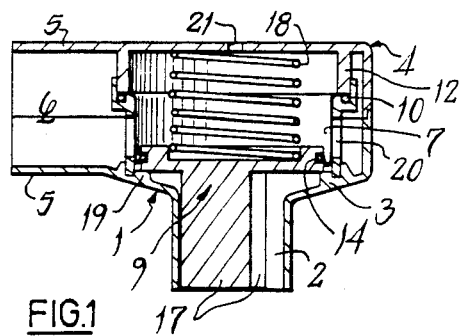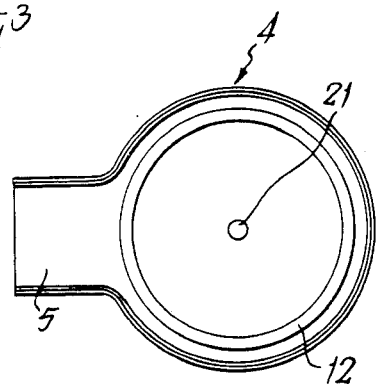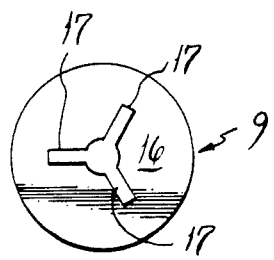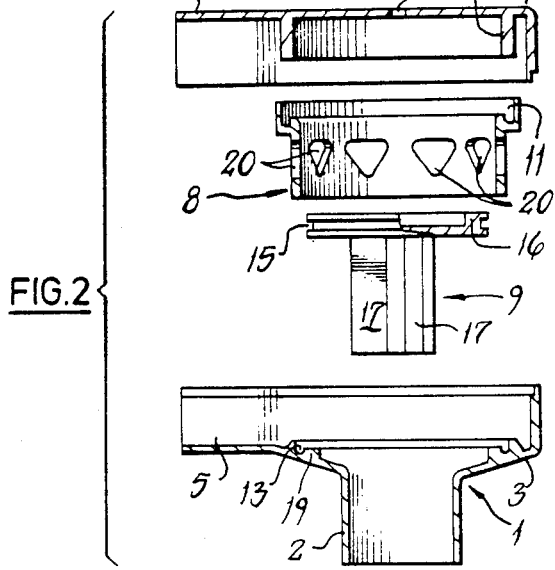

ic
VALVE

TECHNICAL FIELD

This invention relates to a valve suitable for use in venting gases from an enclosure whilst preventing pressure variation in the enclosure due to suction on the outlet side of the valve and maintaining enclosure pressure at some predetermined function of atmospheric pressure.

DISCLOSURE OF INVENTION it is desirable that an engine crankcase breather should vent gases from the crankcase to the induction manifold while at th same time preventing suction in the manifold from reducing the pressure in the crankcase. A failure to vent gases may result in the expulsion of oil from the crankcase while a reduction in the crankcase pressure may draw dirt into the crankcase. An object of the present invention is to provide a valve for use in a crankcase breather to avoid the aforesaid difficulties.

A valve according to the invention comprises a rolling diaphragm supported at its outer periphery by an annular support member within which the diaphragm rolls in response to inlet pressure so as to uncover an outlet opening in the support member, thereby to allow the escape of said presure.

An advantage of this valve is that it operates substantially independently of the pressure on the outlet side of the outlet opening. Suction at the outlet opening will simply cause it to be more firmly sealed by the diaphragm.

Preferably, the diaphragm is annular and is supported at its inner periphery by a guide member that engages an abutment when the outlet opening is closed by the diaphragm and guides the diaphragm so that it rolls to uncover the outlet opening.

DESCRIPTION OF DRAWINGS

The invention will be described by way of examlple with reference to the accompanying drawings in which:

FIG. 1 is an axial section through a valve according to one embodiment of the invention, FIG. 2 is an exploded diagram of the valve of FIG. 1 without the rolling diaphragm, FIG. 3 is an underside plan view of the upper half of the valve housing, of FIGS. 1 and 2.

FIG. 4 is an underside plan view of the valve member of FIGS. 1 and 2.

BEST MODE OF CARRYING OUT INVENTION

Figure 5:
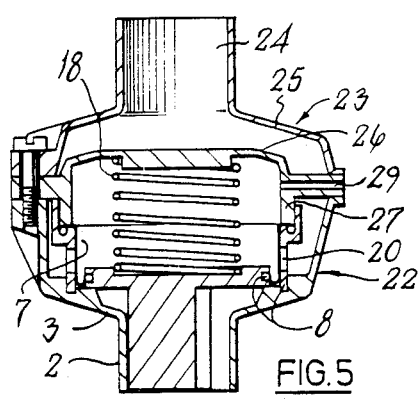
FIG. 5 is an axial section through a valve according to another embodiment of the invention.

The valve illustrated in FIGS. 1 and 2 has a two part housing comprising a lower portion 1 with a cylindrical inlet duct 2 projecting downwards from its base 3, and an upper cover portion 4. A semi-cylindrical formation 5 projects from the side of each housing portion and these formations co-operate to formm an outlet duct 6.

An annular rolling diaphragm 7 is provided within the valve housing between an outer cylindrical support member 8 and an inner guide member 9.

A bead 10 at the outer edge of the diaphragm is held in place in a gallery 11 in the upper end of the support member 8. An annular wall 12 on the underside of the over portion 4 engages the gallery 11 to clamp the bead 10 in place and to locate the support member 8 with its lower end in engagement with a groove 13 in the base 3 of the lower housing portion.

A bead 14 at the inner edge of the diaphragm engages a groove 15 in the outer periphery of a disc-shaped portion 16 of the guide member 9. The guide member has downwardly projecting guide fins 17 that engage within the inlet duct 2 to guide vertical movement of the disc-shaped portion 16. A compression spring 18 between the housing cover portion 4 and the disc-shaped portion 16 serves to urge the latter into engagement with an annular abutment 19 formed in the base of the lower housing portion 1 around the inlet duct 2.

A series of apertures 20 are formed in the wall of the cylindrical support member 8 and are covered by the diaphragm 7 when the guide member 9 engages the abutment 19. However, upwards movement of the diaphragm 7 guided by the guide member at its inner edge causes the diaphragm to roll back on itself and to uncover the apertures 20, thereby allowing communication between the inlet duct 2 and outlet duct 6.

A hole 21 in the cover portion 4 vents the space above the guide member 9 and diaphragm 7 to atmosphere. The strength of the spring 18 determines the pressure at which the valve opens.

An important characteristic of this valve is that, when the diaphragm 7 closes the apertures 20, any fall in pressure in the outlet duct 6 below atmospheric will cause the diaphragm 7 to seal the apertures 20 more firmly. The apertures 20 are shaped so that they are of the reduced width towards their bottoms, thereby giving a progressive initial opening of the aperatures by the diaphragm and a longer initial movement of apertures by the diaphragm and a longer initial movement of the guide member 9 which is thus more easily damped by the spring 18 and air between the diaphragm and the cover portion 4. As illustrated in FIG. 2, each aperture 20 is triangular in shape and is orientated with a point lowermost. However, the apertures 20 could also be circular in shape.

Figure 8:
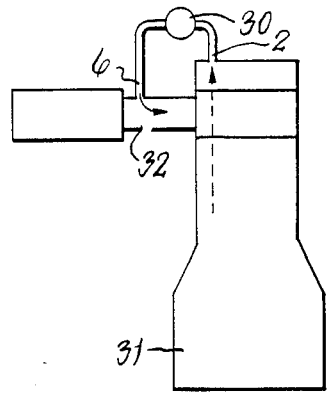
FIG. 8 is a schematic diagram of an engine having a crankcase breather ioncorporating a valve according to the invention.

A typical application in which this feature is important is in an engine crankcase breather where the inlet duct 2 of a valve 30 would be connected to the crankcase 31 and the outlet duct 6 would be connected to the induction manifold 32 of the engine as shown in FIG. 8. The valve would then be responsive to crankcase pressures above atmospheric and would open at a pressure determined by the characteristics of the spring 18 and area of the guide member 9 nd the diaphragm 7 to vent crankcase gases through the outlet duct 6 to the induction manifold. On the other hand, any suction produced in the induction manifold will produce a sealing action of the diaphragm and will not pass through the inlet duct 2 to the crankcase where it could draw dirt in through the crankcase seals.

Figure 6:
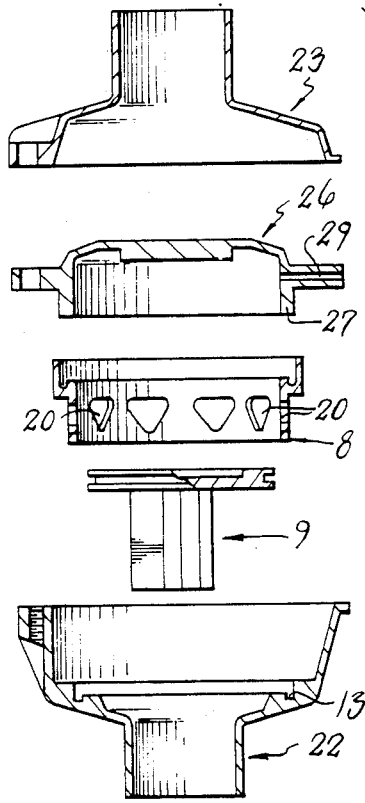
FIG. 6 is an exploded diagram of parts of the valve of FIG. 5 without the rolling diaphragm.
Figure 7:
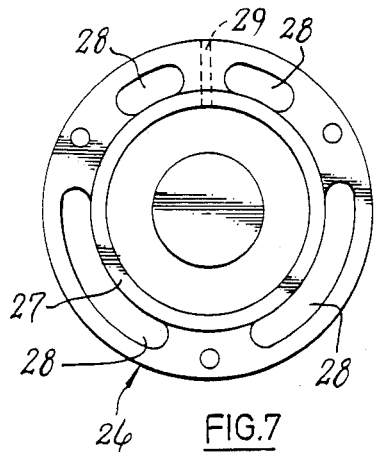
FIG. 7 is an underside plan view of the intermediate part of the valve of FIG. 5.

An alternative embodiment of the invention is illustrated in FIGS. 5 to 7 in which the inlet and outlet ducts are arranged coaxially rather than at right angles to one another. The valve housing again comprises two co-operating portions 22,23. The lower portion 22 has a downwardly projecting inlet duct 2 in its base 3 as in the previous embodiment. The upper cover portion 23 has an upwardly projecting outlet duct 24 in its top wall 25. A disc-shaped intermediate member 26 is clamped at its periphery between the two housing portions 22,23. A guide member 9, a cylindrical support member 8, a diaphragm 7 and a spring 18, all exactly the same as in the previous embodiment, are provided within the valve housing and located by a groove 13 in the base 3 of the lower housing portion 22 and an annular wall 27 on the underside of the intermediate member 26 that corresponds to the wall 12 of the previous embodiment. The annular space between the support member 8 and lower housing portion 22 communicates with the outlet duct 24 via apertures 28 formed in the intermediate member 26. A bore 29 vents to atmosphere the space between the guide member 9 and diaphragm 7 and the intermediate member 26.

This valve operates in exactly the same manner as the previous embodiment but when the valve is open, the inlet duct 2 communicates with the outlet duct 24 through the apertures 20 and 28.

I claim:

1. An internal combustion engine having a crankcase, an induction manifold and a valve to vent gases from the crankcase to the induction manifold when the pressure in the crankcase exceeds atmospheric pressure, characterized in that the valve comprises a housing (1,4) having a gas inlet (2) connected to the crankcase, a gas outlet (6) connected to the induction manifold, inner and outer coaxial members (9,8) with the inner member (9) movable against spring means (18) in response to gas pressure, an annular flexible diaphragm (7) connected between said pair of members and having a portion of U-section that moves with said inner member (9), and an aperture (20) in said outer member with which the diaphragm (7) cooperates to close said aperture (20) in response to movement of said inner member (9) said inner member (9) being located in relation to the gas inlet (2) so as to be responsive to gas inlet pressures, and the outer member (8) being located within the housing and being formed with said aperture (20) therein so as to communicate between said gas inlet and outlet when uncovered by the diaphragm (7).

2. A valve as claimed in claim 1 in which the inner member (9) engages an abutment (19) under loading applied by said spring means (18).

3. A valve as claimed in claim 2 in which the inner member (9) carries a guide member (17) that cooperates with the gas inlet (2).

4. A valve as claimed in claim 3 in which said aperture (20) is of reduced width towards that part which is first uncovered by the diaphragm (7).

5. A valve as claimed in claim 4 in which said aperture (20) is triangular in shape.

6. A valve as claimed in claim 1 in which there is a plurality of apertures (20) around said outlet member (8).

7. A valve as claimed in claim 1 in which the outer periphery (10) of the diaphragm (7) is located between one part (12) of the housing (4) and the outer member (8).

* * * * *